Patented Oct. 20, 1942

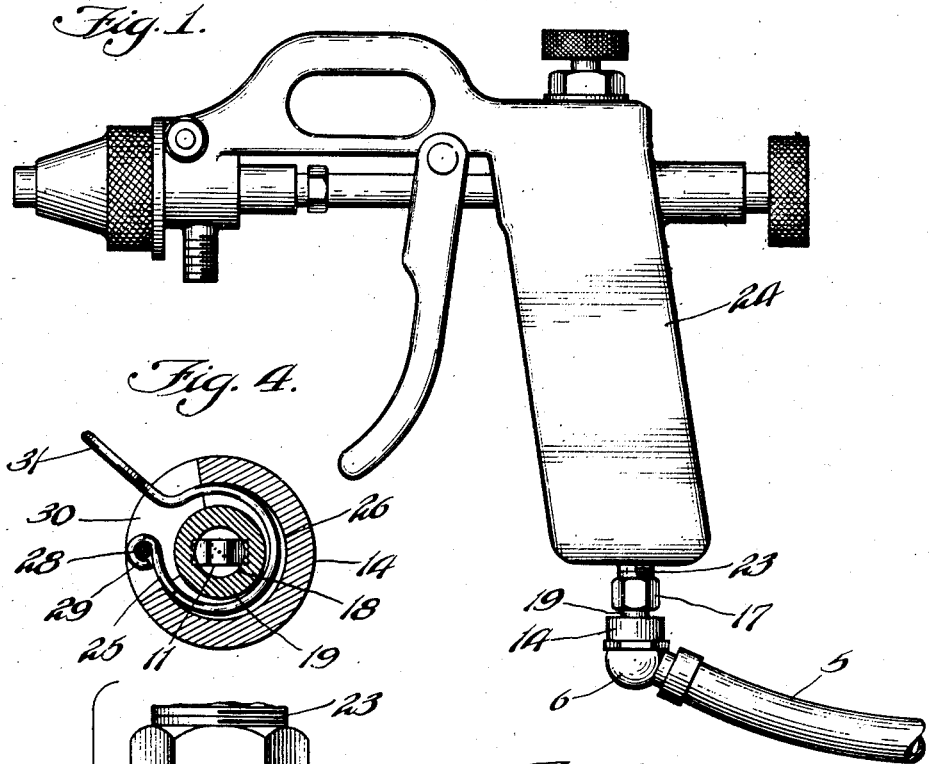
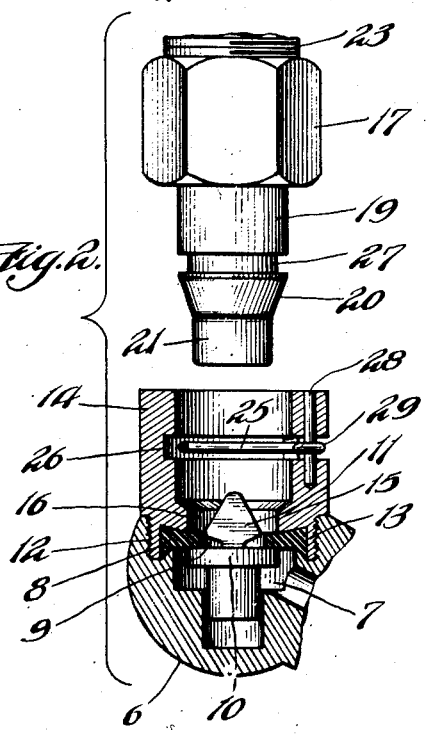
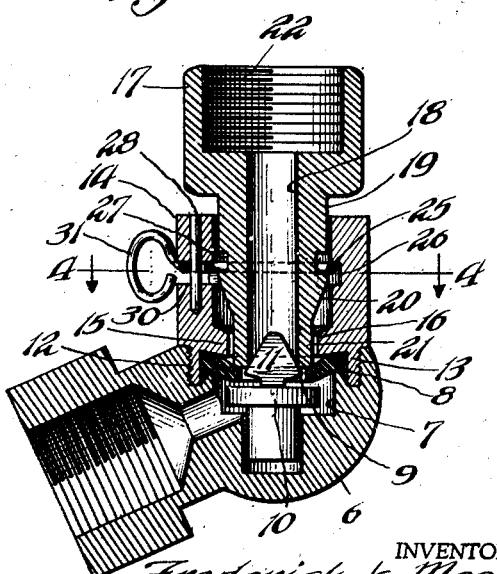

2,299,643

UNITED STATES PATENT OFFICE 2,299,643

VALVED CONNECTOR

Frederick K. Moody, Chicago, Ill.

Application July 3, 1940, Serial No. 343,795

2 Claims. (Cl. 284—17)

This invention is a connector for hose or pipes and has associated therewith, or forming a part thereof, a valve in the nature of a check valve for closing the hose when the coupling is uncoupled. It is particularly intended for use with air hose such as used for supplying compressed air to portable pneumatic tools such as spray guns, lubricating guns, blow guns, tire gauges, or the like. It may be used for connecting a pneumatic tool to a single hose line or to a plurality of wall outlets or supply pipes.

One object of the invention is to provide a particularly small, light connector of the kind indicated which is composed of comparatively few parts and may be cheaply made, while at the same time being practical and efficient in operation.

Other objects of the invention are to provide means whereby air hose chucks such as those commonly known as "Dill" or "Shrader" chucks, may be combined with coupling means to provide a coupling and valve closure; to provide a coupling which may be readily coupled and uncoupled preferably by the use of one hand; to provide a coupling which will also act as a swivel for the hose; and to provide such other advantages and improved features as will be described hereinafter.

In the accompanying drawing illustrating this invention,

Figure 1 is a side view of the coupling showing it as used for connecting a hose to a pneumatic tool, as for instance a spray gun, which is illustrated more or less diagrammatically;

Figure 2 is an exploded view showing the device in uncoupled position, parts being shown in section;

Fig. 3 is a longitudinal sectional view showing the coupling in coupled position; and Figure 4 is a cross sectional view taken on the line 4—4 of Figure 3.

In accordance with the illustrations in the drawing, 5 indicates any hose or pipe such as used for supplying compressed air or the like for driving a pneumatic tool or for any purpose for which such air or fluid supply may be desired. The end of the hose 5 is secured to a fitting 6 which preferably comprises the main portion or body portion of a chuck such as a "Dill" or "Shrader" chuck used for filling tires. The chuck has the usual central opening or recess 7 and packing disc or washer 8. The washer has a central outlet opening 9 which is opened and closed by a coacting valve member 10 which is mounted in the usual manner in the chuck and which has a projection 11 which is preferably tapered and coacts with any suitable engaging member for opening the valve. The threaded opening 12 in the chuck is engaged by the correspondingly threaded end 13 of my improved fitting or coupling member 14 which is screwed into the chuck and which has an inwardly projecting flange 15 that engages with the washer 8 to make a tight closure between the fitting and the chuck body. The flange 15 defines a central opening 16 for receiving the projection 11.

The fitting and valve parts are engaged at times by a hollow plug or coupling member 17 which has a central hole 18 slightly less in diameter than the width of the wider portion of the projection 11 on the valve. The main portion 19 of the coupler fits freely in the opening in the fitting 14 and is then tapered or provided with a conical portion 20 connecting with the cylindrical end 21 which passes freely through the hole 16 in the fitting as clearly shown in Figure 3. The outer end of the coupling 17 is preferably made hexagonal or of suitable shape to be engaged by a wrench and is threaded as shown at 22 to engage with the tool or member to which air is to be supplied, as for instance the threaded inlet pipe or nipple 23 of a spray gun 24 as shown in Figure 1.

The coupler 17 is held in engaging position in the fitting by any suitable means such as a spring or wire 25 which is mounted in an annular groove 26 in the fitting 14 and engages at times with a groove 27 in the coupler, this groove being approximately at the base of the conical section 20 as shown in Figure 2. One end of the spring ring 25 is held by means of a pin 28 in the fitting 14 which engages with an eye 29 at the end of a ring as shown in Figure 4. The opposite end of the ring extends out through a slot 30 in the connector and is provided with a projection or thumb piece 31 for spreading or opening the ring.

When the connector is uncoupled and air is supplied to the hose 5 the valve will be closed as shown in Figure 2. When the coupling 17 is inserted the conical portion 20 will tend to spread or open the fastening ring 18 to permit such portion to pass therethrough and the reduced end 21 of the coupling will engage with the projection 11 and force the valve 10 away from the washer or valve seat 8, to open position. The end of the coupling when fully inserted will then engage with the washer to make a close or airtight joint between the coupling and the chuck. When the parts reach this position the spring ring 25 will enter the slot 27 in the coupling and will hold the coupling securely in operative position.

When the connector is to be uncoupled the spring ring is spread or opened by means of the thumb-piece 31 so that it will disengage the slot in the coupler and permit the coupler to be removed from the chuck. Usually the air pressure is sufficient to blow the connector out of engagement as soon as it is released so that the connector may be readily uncoupled by one hand. As soon as the coupling 17 releases the valve the valve will return to normal or closed position.

While my improved valved connector may be made in any desired size or for different uses it is particularly applicable for small tools such as spray guns or the like. In operating these tools the weight is a matter of important consideration as it becomes tiresome for the operator to hold up any considerable weight for long periods of time. My improved coupling may be made very light and compact and will add little to the weight of the apparatus. Furthermore the coupling portion may be more or less permanently affixed to the tool and will provide means for quickly engaging and disengaging the tool from the supply line. Furthermore the coupling will swivel in the chuck or fitting while maintaining an airtight connection and thus prevents kinks in the hose and permits the ready swinging of the tool.

While I have shown a preferred embodiment of my invention, changes may be made to adapt the same to different terminal or coupling devices or valves, or for different uses, and therefore I do not wish to be limited to the particular construction herein shown and described except as set forth in the following claims, in which

I claim:

1. In a hose connector, the combination of a chuck having the usual check valve and packing washer, a cylinder having one end connected with the chuck and having an annular portion engaging with the washer to hold the same in operative position, an annular spring ring mounted in a groove in the cylinder, means for holding one end of the ring, the opposite end of the ring having an extension projecting outwardly from the cylinder for opening the ring, a coupling member having a main body portion fitting in the cylinder and having a reduced end for engagement with the valve to open the same and with the washer to make a tight coupling, said member having a conical portion adjacent the reduced end and having a groove at the base of the conical portion for receiving the spring ring, the arrangement being such that the conical portion may be pushed through the ring to expand the same and to cause the ring to engage with the groove to hold the coupling in operative position.

2. In a hose connector, the combination of a chuck having a check valve and packing washer, a cylinder having threaded engagement with the chuck and having an annular portion engaging with the washer to hold the same in position, locking spring means mounted in a groove in the cylinder and operable from the outside of the cylinder, a coupling member having a main body portion fitting in the cylinder and having a reduced end for engagement with the valve to open and close the same and engaging with the washer to make a tight connection, said member having a conical portion adjacent the reduced end and having a groove at the base of the conical portion for receiving the spring means, the arrangement being such that when the conical portion passes beyond the locking spring means, it will move the same out of normal position and said locking spring means will engage with the groove to hold the coupling in position with the valve open.

FREDERICK K. MOODY.